United States Patent [19]

Replin

[11] 4,035,026

[45] July 12, 1977

[54] METHOD AND DEVICE FOR AIDING AND ENHANCING ROTARY MOTION

[75] Inventor: Henry Replin, Denver, Colo.

[73] Assignee: Vector Bearing Corporation, Englewood, Colo.

[21] Appl. No.: 723,587

[22] Filed: Sept. 15, 1976

Related U.S. Application Data

[63] Continuation-in-part of Ser. No. 538,684, Jan. 6, 1975, abandoned.

[51] Int. Cl.² .......................................... F16C 33/30
[52] U.S. Cl. .................................. 301/5 R; 64/10; 308/189 R
[58] Field of Search ............. 301/5 R, 63 R, 63 DS, 301/63 PW; 74/243 PC; 64/1 V, 6, 10, 22; 308/189 R, 190

[56] References Cited

U.S. PATENT DOCUMENTS 2,622,418  12/1952  Howison ......................... 74/243 PC
3,948,563   4/1976  Replin ................................ 301/5 R Primary Examiner—Joseph F. Peters, Jr.
Assistant Examiner—Gene A. Church
Attorney, Agent, or Firm—Ralph H. Dougherty

[57] ABSTRACT

Method and device for aiding and enhancing rotational movement of a member journaled with another member by biassing one of the members to an offset position relative to the other member with the offset being unstable and tending to aid rotation as a restorative force. Particularly, a bearing device having inner and outer members which are interfaced and supported in the portion of the bearing closest to the direction from which the load is imposed and in which roller members sequentially and substantially continuously offset the inner member during rotation to maintain an offset having a constant orientation relative to the load applied through the bearing device.

12 Claims, 8 Drawing Figures

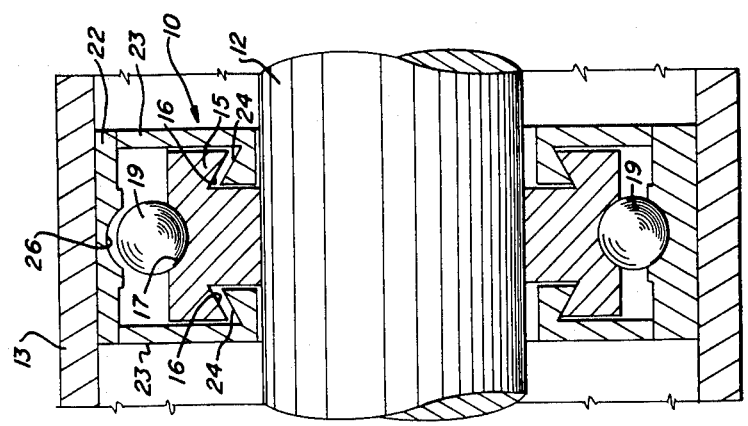
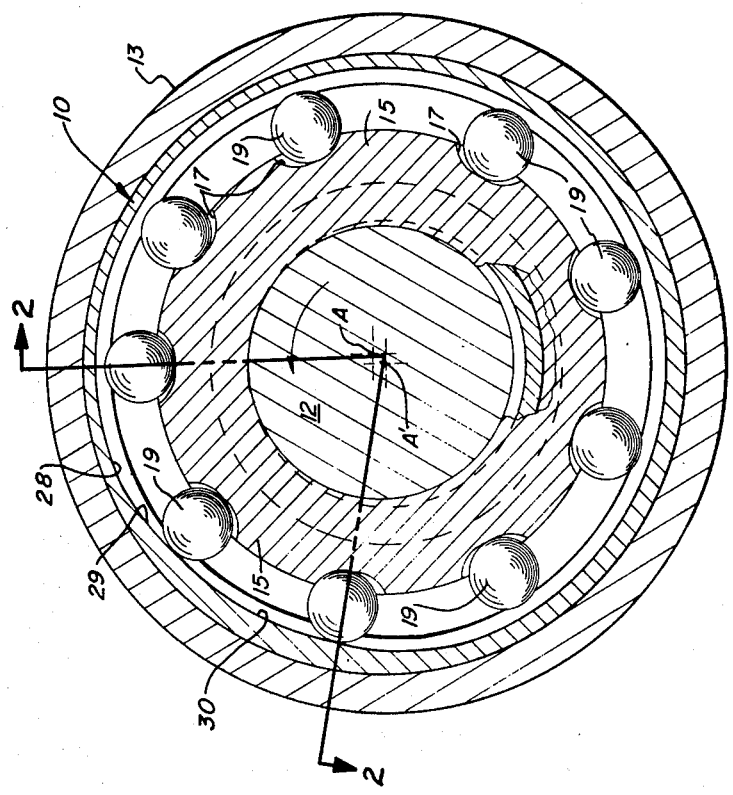

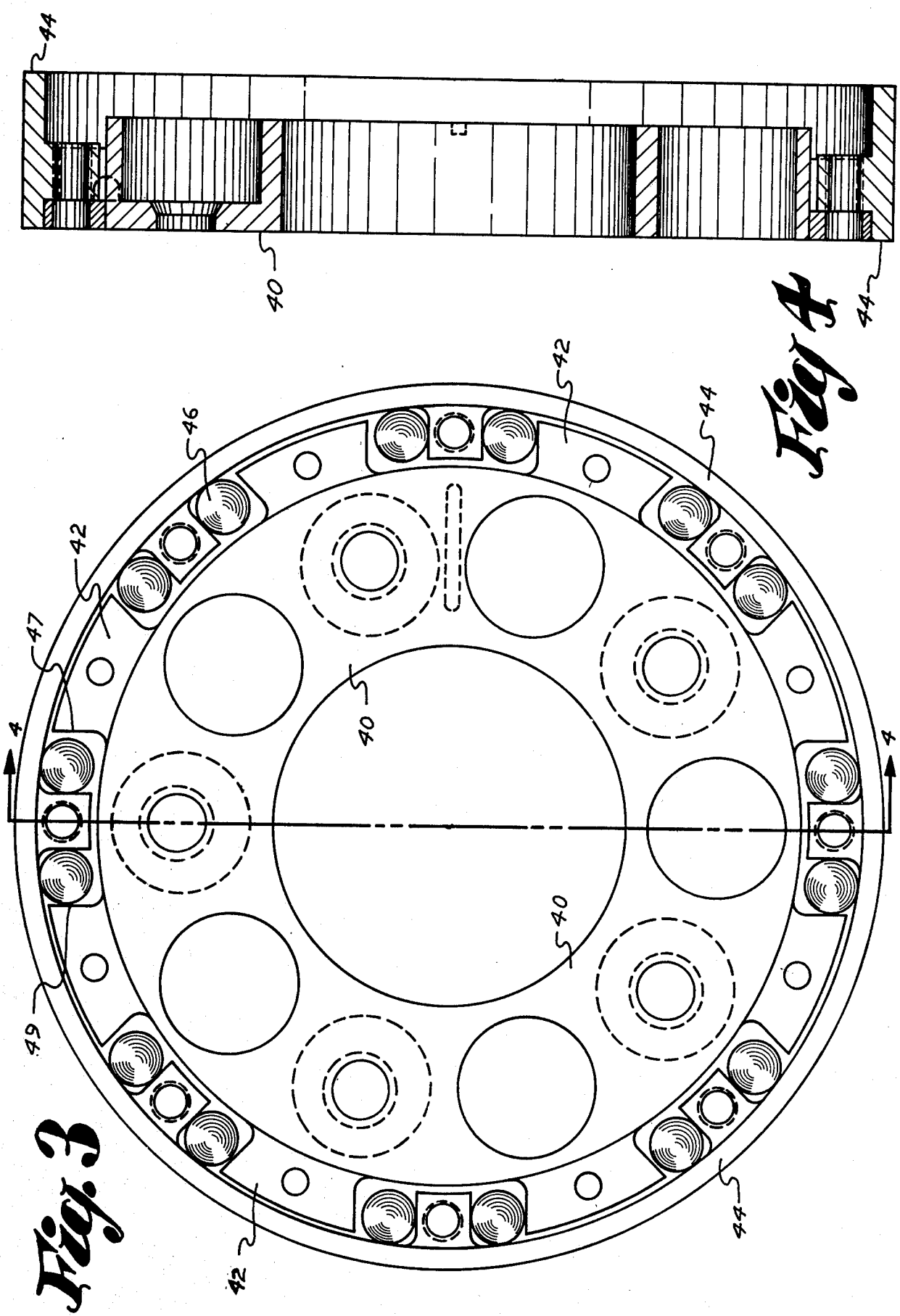

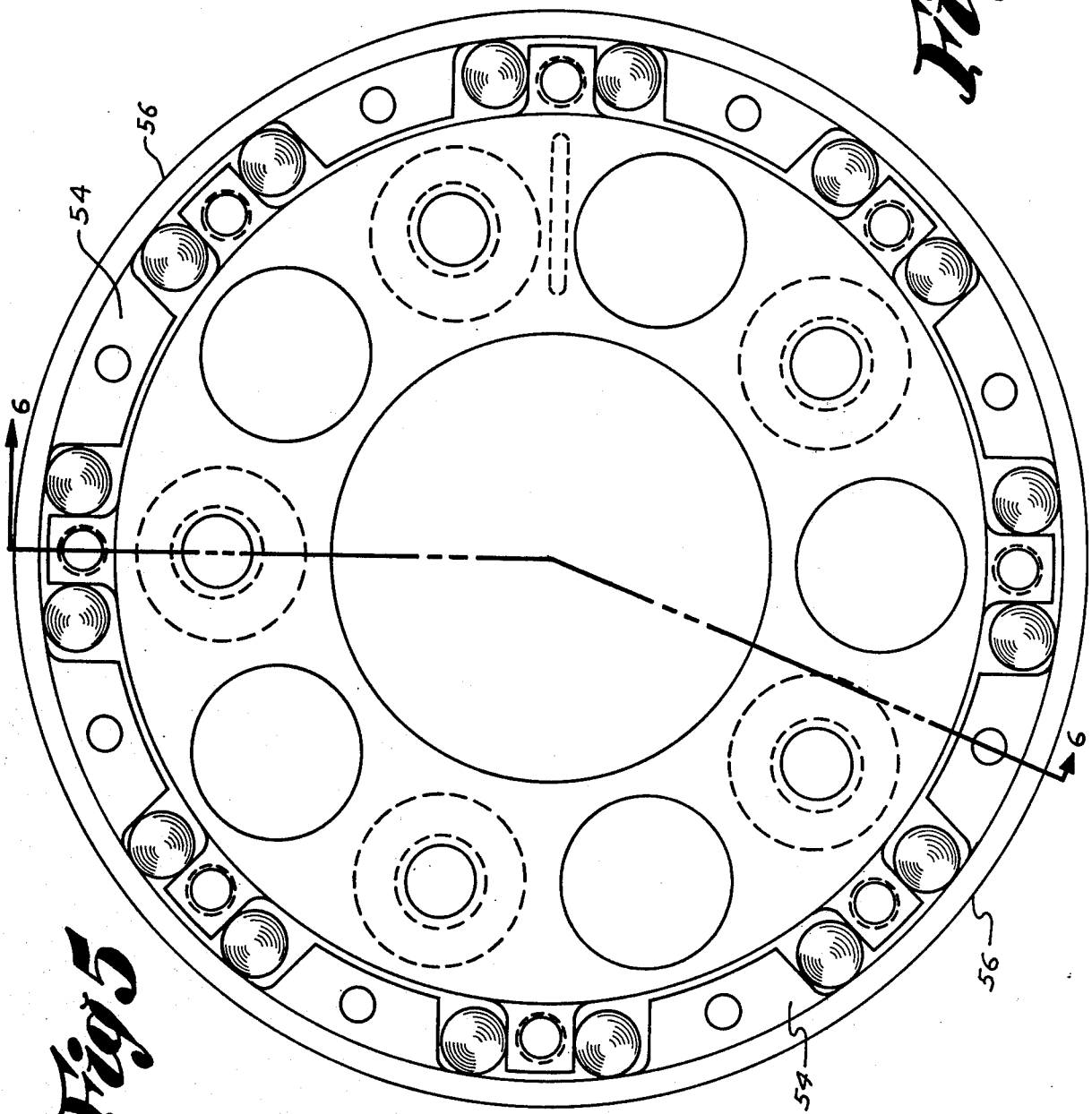

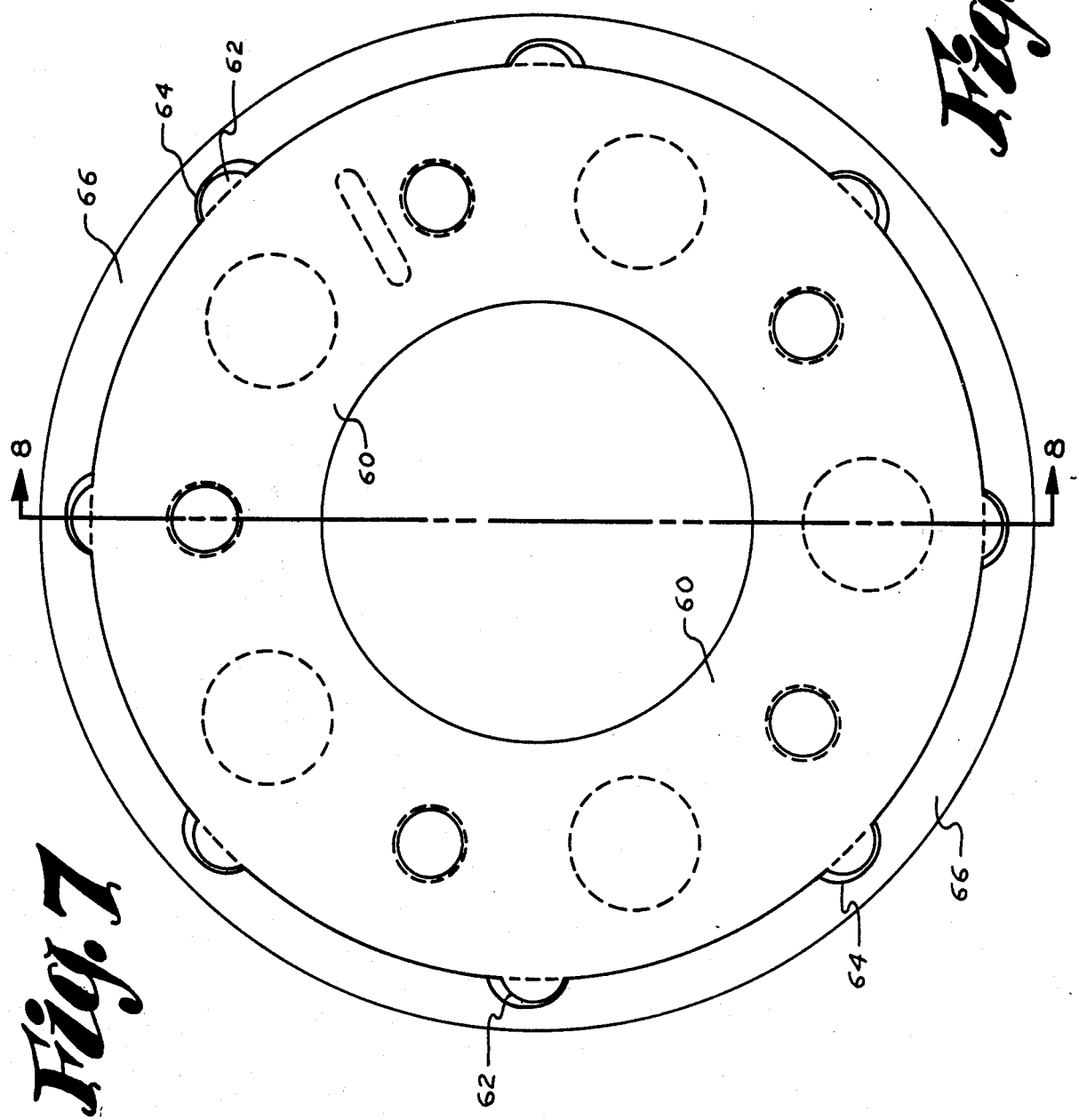

METHOD AND DEVICE FOR AIDING AND ENHANCING ROTARY MOTION

CROSS REFERENCE TO RELATED APPLICATION

This is a continuation-in-part application of patent application Ser. No. 538,684, filed Jan. 6, 1975, now abandoned.

BACKGROUND OF THE INVENTION

1. Field of the Invention

The present invention relates generally to load aided rotational devices and methods of enhancing rotation.

2. Description of the Prior Art

The wheel is a classical rotational device. Generally, the load borne by the wheel is imposed directly from the contact portion of the wheel with the support surface through a vertical radius of the wheel to the supporting axle. To turn the wheel, pure torque is applied to the wheel or the axle thereby producing a twisting force substantially independent of the load-bearing function of the wheel.

In U.S. Pat. No. 3,948,563, a method and apparatus for interfacing a wheel with an axle to offset the load supplied to the wheel to a constant position in the portion of the wheel leading the contact point of the wheel to the supporting surface is disclosed. In this prior concept, the axle and wheel are interfaced through a movable and selectively engagable connection.

SUMMARY OF THE INVENTION

The present invention which provides a heretofore unavailable improvement over previous rotational devices, comprises a method and device for offsetting a member to which a torque is applied, such as an axle, in such a manner as to permit the axle to be fixedly and securely attached to a wheel bearing on a supporting surface while the load is applied offset to the vertical radius of the wheel. More particularly, the device of instant invention comprises a bearing structure which selectively and sequentially offsets a rotating or driven axle contained within a relatively fixed housing to a position which provides a restorative force seeking to relocate the axle within the housing and thereby providing an aiding and enhancing force arrangement. Alternatively, the device can comprise a bearing structure on a fixed axle which sequentially relocates within a fixed housing to a position which provides the restorative force seeking to relocate the axle upwardly within the housing and thereby producing and enhancing force arrangement which assists in causing the wheel external to the axle to roll, thereby moving its axis in the same direction as the axis of the axle.

Accordingly, the principal object of the present invention is to provide a device and method for aiding and enhancing rotation of a wheel.

Another object of the present invention is to provide a device and method for applying torque to enhance traction between a wheel member and a supporting or driving surface.

Still another object of the present invention is to provide a device and method which provides a rotational force couple acting around and offset from the load contact portion of a circular member.

Another object of the present invention is to provide device and method for applying the load imposed upon a circular member at a position other than through the center of the circular member.

A further object of the present invention is to provide a device and method which provides improved braking performance and characteristics in vehicle wheel assemblies.

Another object of the present invention is to provide a device and method for transmitting greater amounts of torque between a circular member and a supporting surface.

Yet another object of the present invention is to provide a device and method for enhancing fuel consumption requirements of powered wheeled vehicles, particularly to reduce the fuel input requirements for wheeled vehicles powered by internal combustion engines.

These and other objects and features of the present invention will become apparent from the following detailed description.

BRIEF DESCRIPTION OF THE DRAWINGS

FIG. 1 is a partially cut-away sectioned side view of a bearing assembly according to the instant invention; and FIG. 2 is a partially sectioned end view of the bearing device of FIG. 1.

FIG. 3 is a side view of an alternative bearing assembly in accordance with the invention.

FIG. 4 is a sectional view taken along line 4—4 of FIG. 3.

FIG. 5 is a side view of an alternative assembly to that if FIG. 3.

FIG. 6 is a sectional view taken along line 6—6 of FIG. 5.

FIG. 7 is a side view of another alternative assembly which can be utilized in a vehicle wheel.

FIG. 8 is a sectional view taken along line 8—8 of FIG. 7.

DETAILED DESCRIPTION

Turning now to the drawing wherein like components are designated by like reference numerals throughout the figures, a device for enhancing rotation is illustrated in FIGS. 1 and 2 and generally designated by the reference numeral 10.

Device 10 carries a rotatable axle 12 and is carried in a fixed outer housing 13. Disposed on axle 12, preferably in a pressed fit relationship, is inner member 15. Beveled inner bearing surfaces 16 are defined on inner member 15 and interface the remainder of device 10 as will be discussed below. Inner race depressions 17 are defined on the periphery of inner member 15 and carry ball bearings 19. It should be noted that the primary bearing function of inner member 15 is served by inner bearing surface 16, which may alternatively be in the form of ball or roller bearings rather than the plane bearing surface as shown, and ball bearings 19 serves a unique displacement function which is not primarily a classical bearing function.

Outer member 22 is preferably pressed into outer housing 13 and includes as an integral part end portions 23 having beveled outer bearing surfaces 24 defined thereon. End portions 23 are separate from outer member 22 only for purposes of machining and assembly. Accordingly, one of end portions 23 may be formed integral with outer member 22. Inner bearing surface 16 is of a somewhat larger diameter than outer bearing surface 24. Thus, axle 12 is not concentric with outer housing 13 but is free to seek a center eccentric to outer housing 13. Outer race groove 26 defined in outer member 22 receives ball bearings 19 thus securing ball bearings 19 between inner race depressions 17 and outer race groove 26. However, as shown in FIG. 1 outer race groove 26 is not circular but includes a large diameter portion 28, a ramp portion 29 and a smaller diameter portion 30. Smaller diameter portion 30, which is located primarily in the leading half of outer race groove 26 and immediately below ramp portion 29 is of such a dimension as to preclude axle 12 being concentric with outer housing 13. Accordingly, axle 12 is displaced primarily away from smaller diameter portion 30, and, as a result of the dynamically displaced interface of inner bearing surface 16 and outer bearing surface 24, upward to a center A shown in FIG. 1. Outer housing 13 has a center at A'. Axle 12, as a result of the displacement of center A, experiences restorative forces applied not through the center A of axle 12 but rather through inner member 15 from outer member 22 and outer bearing surfaces 24 and through ball bearings 19 which tend to rotate axle 12 in the direction of the arrow appearing in FIG. 1. Further, the restorative force, not passing through the center of axle 12, will, in the instance of a wheel assembly attached to axle 12, tend to rotate the wheel around the load imposed at the instantaneous center of rotation of the wheel in contact with the supporting surface. This type of rotation is more advantageous than the conventional concept of transferring a load through a radius of the wheel and applying the pure torque to the wheel.

In the invented method wherein a wheel bearing is fixed to an axle and has a rotatable member (or outer member) fixed to a wheel, the load is applied to the axle horizontally offset from the center of rotation of the wheel. Torque is applied to either the wheel or the axle whichever is movable; that is, to whichever one rotates. In a bicycle, an axle is fixed and torque is applied to the wheel. In a powered vehicle, the wheel is fixed and torque is applied through the axle to turn the wheel. Ball bearings 19 serve a unique displacement function of displacing the rotation member, in this case the wheel and its housing 13, to a non-concentric position relative to the fixed member by positioning roller means 19 between the members and causing them to sequentially exert a tangential force against a non-circular actuator portion in a quadrant of an outer race 26, which actuator portion comprises a large diameter portion 28, a ramp portion 29, and a small diameter portion 30. A restorative or resistive force which attempts to return the bearing to its equilibrium state is exerted by the portions of the outer race contacting the roller or ball bearings 19, but being in a closed system merely deflects the ball bearings downwardly, thereby assisting in aiding rotation of the wheel, for the wheel and its center of rotation are spaced ahead of the center of the axle by the horizontal distance from A to A'.

An alternative embodiment to the device of FIGS. 1 and 2 is set forth in FIGS. 3 and 4.

Driving disc 40 is attached to the axle, now shown, and is offset downwardly in the same manner as member 15 of FIG. 1. Driving disc 40 contains a number of projections 42 on its outerperimeter. Driven disc 44 is attached to the wheel to be driven thereby. This driven disc or outer ring is centered with respect to the axle. Rollers 46 are positioned between the driving disc and the driven disc. Surface 47 of projection 42 is the driving surface when the axle is to be driven counter-clockwise, while surface 49 of projection 42 is the braking surface.

The housing for this assembly includes a horizontal slot arrangement which allows the selective positioning of actuator 40 horizontally, to the left in the driving mode and to the right in the braking mode.

FIG. 5 shows and alternative embodiment to that of FIG. 3, wherein the driving projections 54 are carried on outer ring 56. In all other regards, this embodiment is the same as that of FIG. 3. FIG. 7 is a simplified alternative embodiment whereby an actuator 60 contains a number of projections 62 adapted to contact selected portions of a recess 64 in outer race 66. The recess is not a continuous arc of the circle, but is two arcs connected by a tangential segment. Alternatively, the projections 62 could be rollers housed in actuator 60, which would reduce friction between the inner and outer races. In the situation where there are a number of rollers, which can be very short, they are placed between the inner and outer races and have a retaining member on each side or end of the roller to form what might be termed a roller cage. The actuator or inner ring rides in the outer race in an annular groove and is offset downwardly and horizontally in the same manner as that of FIG. 1.

In another alternative embodiment which is generally the reverse of FIG. 7, the projections can be placed on the outer race whereby they would project inwardly to generally mating recesses on the inner race. The outer race is connected directly to a wheel rim. There is a differential in movement between the inner race and the outer race which is caused by the vertical and horizontal offsets. This transfers the load either forward or back of center. Surface 70 carries the full radial load whereas surface 72 carries the pulse of actuator 60. Note that the recess 64, whether it be in the outer or inner race, must have a raduis greater than that of the projection 62 to effect the required lifting force on the outer race.

Summarly, the instant invention involves a method and device for offsetting the loading on a rotational member to a position such that the load vector does not pass through the center of the rotational member. This is accomplished by a bearing structure having means to substantially constantly displace the rotating member to a position in which the restorative forces tend to aid and enhance rotation.

Although several embodiments of the instant invention have been illustrated and described, it is anticipated that other changes and modifications will be apparent to those skilled in the art and that such changes may be made without departing from the scope of the invention, as defined by the following claims.

What is claimed is:

1. A method of load-aiding rotary motion of a rotating member of a wheel bearing having inner and outer races, said member being radially displaced from a fixed member and having a load applied thereto horizontally offset from its center, said method comprising:
   providing a non-circular portion on one of said outer and inner races, said non-circular portion of said race having a large diameter portion, a ramp portion, and a small diameter portion;
   applying torque to the rotating member to induce rotation thereof;
   displacing the rotating member to a non-concentric position relative to the fixed member by positioning bearing means between the members and causing said bearing means to sequentially exert a tangential force on said non-circular portion of said race, imposing at least part of the load from the fixed member to the rotating member at a position on the rotating member spaced from the center of the rotating member and in the direction having a substantial component in the direction of rotation of and spaced from the center of the rotating member;

whereby the load force imposed on the rotating member being offset from the center of rotation induces rotation, and thus is applied in a more advantageous manner than if the same load force were applied through the center of rotation.

2. A method according to claim 1 in which the rotating member is an axle secured within a housing with substantial radial freedom of movement within the housing, and in which the axle is radially displaced to a non-concentric relationship relative to the housing by roller means positioned intermediate the housing and the axle.

3. A method according to claim 1 in which the fixed member is an axle and said rotating member is said outer race of said bearing.

4. A device for loading aiding a rotating member having a load imposed thereon comprising an inner member, an outer member at least partially surrounding the inner member, complementary bearing means located on the inner member and on the outer member to position the inner member within the outer member to accommodate substantial radial movement of the inner member within the outer member, and an inner surface on the outer member eccentric relative to the outer member, an outer surface on the inner member having securing means thereon, and roller means disposed between the inner surface of the outer member and engaged by the securing means on the outer surface of the inner member, whereby a portion of the eccentric inner surface on the outer member bears upon the roller means and selectively displaces the inner member in a substantially constant manner to transfer a load force to the inner member from the surface of the outer member at a position and in a direction spaced from the center of the inner member.

5. A device as set forth in claim 4 in which the means securing the inner member within the outer member comprise axially outwardly projecting bearing surfaces disposed facing radially inwardly on the inner member and axially inwardly projecting bearing surfaces disposed facing radially outward on the outer member, the bearing surfaces on the inner member being of a larger diameter than the bearing surfaces on the outer member.

6. A device as set forth in claim 5 in which the bearing surfaces are beveled.

7. A device as set forth in claim 4 in which the roller means are ball bearings.

8. A device as set forth in claim 4 in which the roller means are roller bearings.

9. A device as set forth in claim 4 in which the roller means are needle bearings.

10. A device as set forth in claim 4 in which the eccentric inner surface of the outer member is defined in the outer member to comprise a larger diameter portion, a ramp portion, and a smaller diameter portion with the ramp portion connecting the larger diameter portion and the small diameter portion.

11. A device as set forth in claim 4 in which the device is oriented to receive a load in a given direction and the inner member is displaced with the center thereof above the center of the outer member relative to the direction from which the load is imposed.

12. A device for loading aiding a rotating member having a load imposed thereon comprising: an axle having an inner member extending radially outward therefrom and attached thereto, an outer member disposed within a housing and extending circumferentially around the radially spaced from the inner member, circumferential bearing surfaces defined concentrically on the inner member and projecting axially from the inner member and facing radially inwardly direction, complementary circumferential bearing surfaces defined on the outer member extending axially inward and facing radially outward, the bearing surfaces defined on the inner member being of a large diameter than the bearing surfaces defined on the outer member, a plurality of roller means disposed between the inner member and outer member, an eccentric surface defined on the inner surface of the outer member and adapted to receive the roller means and retaining means defined in the inner member outer surface adapted to receive the roller means, whereby the eccentric surface defined on the outer member bears upon the roller means and accordingly upon the inner member to displace the inner member and to induce forces on the inner member which aid rotation and enhance rotation.

* * * * *